United States Patent [19]

Kim

[11] Patent Number: 5,797,365
[45] Date of Patent: Aug. 25, 1998

[54] INTAKE PORT DEVICE FOR AN ENGINE OF A VEHICLE

[75] Inventor: Yoon-Taek Kim, Kyungki-do, Rep. of Korea

[73] Assignee: Hyundai Motor Co., Ltd., Seoul, Rep. of Korea

[21] Appl. No.: 674,569

[22] Filed: Jul. 5, 1996

[51] Int. Cl.$^6$ ............................................. F02M 35/00
[52] U.S. Cl. ........................................... 123/184.56
[58] Field of Search ......................... 123/184.56, 537

[56] References Cited

U.S. PATENT DOCUMENTS

| | | | |
|---|---|---|---|
| 4,274,368 | 6/1981 | Shaffer | 123/184.56 |
| 4,465,035 | 8/1984 | Carr | 123/184.56 |
| 4,928,638 | 5/1990 | Overbeck | 123/184.56 |
| 5,216,985 | 6/1993 | Brummer et al. | 123/184.56 |
| 5,311,848 | 5/1994 | Isaka et al. | 123/184.56 |

FOREIGN PATENT DOCUMENTS 91-061669 3/1991 Japan.

*Primary Examiner*—David A. Okonsky

[57] ABSTRACT

An intake port device for an engine of a vehicle includes a cylinder head having an intake port therein, an intake valve, disposed at an end of the intake port leading to an engine cylinder, for opening and closing the intake port, and a cross-section controller for controlling a cross-sectional area of a portion of the intake port. The cross-section controller includes an elastic member disposed about an inner wall of the intake port, and a movable member forming a portion of the inner wall of the intake port. The movable member may be a hydraulically controlled piston which moves according to the speed of the engine so as to change the cross-sectional area of the intake port; thus, properly and effectively generating a swirling air flow to improve combustion within the engine.

17 Claims, 1 Drawing Sheet

INTAKE PORT DEVICE FOR AN ENGINE OF A VEHICLE

BACKGROUND OF THE INVENTION

1. Field of the Invention

The present invention relates to an intake port device for an engine of a vehicle and more particularly, to an intake port device for use in a double overhead cam shaft (hereinafter "DOHC") engine of a vehicle.

2. Description of Related Art

Various types of intake port devices for an engine of a vehicle are known in the art. Generally, as shown in FIG. 1, the intake port device includes a cylinder head 10, an intake port 30 formed in the cylinder head 10 as an intake and exhaust passage, an intake valve 20 which opens to allow air or an air mixture in the intake port 30 to enter into a cylinder 11 and which closes before a piston in the cylinder 11 compresses the air.

The conventional intake port 30 of the DOHC engine has a large cross-sectional area in order to allow induction of a large volume of air into the cylinder 11. Therefore, when the engine operates at high speed, the air intake structure is very effective. When the engine operates at a low speed, however, the air intake structure suffers from a number of problems. For example, the air intake structure does not generate a swirling air flow since the speed of air induction is low due to the large cross-sectional area of the intake port 30. Therefore, the combustion performance of the DOHC engine experiences a drop in efficiency.

Japanese Patent Laid Open Publication No. 3-61,669 discloses a turbulent flow generating device which includes an intake passage and a fuel adhesion part disposed on the inner wall surface of a suction port of the intake passage; whereby an eddy current in the vertical direction is allowed to flow down on the fuel adhesion part, and fuel atomization can be accelerated. However, since this turbulent flow generating device cannot change the cross-sectional area of the intake port, fuel atomization cannot be accomplished when the engine operates at low speed. Furthermore, the turbulent flow generating device is complicated in structure.

SUMMARY OF THE INVENTION

Accordingly, it is an object of the present invention to provide an intake port device for an engine of a vehicle, which eliminates the above problems encountered with conventional intake port devices.

A further object of the present invention is to provide an intake port device for a DOHC engine which is simple in structure, and inexpensive to manufacture.

These and other related objects are achieved by providing an intake port device for an engine of a vehicle, comprising a cylinder head having an intake port therein; an intake valve, disposed at an end of said intake port leading to an engine cylinder, for opening and closing said intake port; and cross-section control means for controlling a cross-sectional area of a portion of said intake port. The cross-section control means includes an elastic member disposed about an inner wall of said intake port; and a movable member forming a portion of the inner wall of said intake port. The movable member may be a hydraulically controlled piston which moves according to the speed of the engine so as change the cross-sectional area of the intake port; thus, properly and effectively generating a swirling air flow to improve combustion within the engine.

Other objects and further scope of applicability of the present invention will become apparent from the detailed description given hereinafter. It should be understood, however, that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitative of the present invention, and wherein.

DESCRIPTION OF THE PREFERRED EMBODIMENTS

Figure 1:
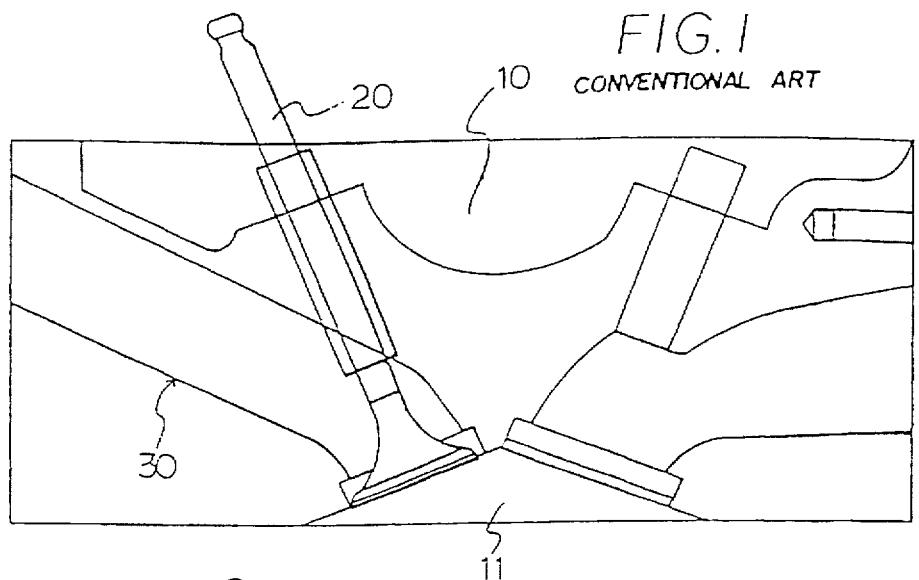
FIG. 1 is a diagrammatic top plane view of a conventional intake port device for an engine of a vehicle.
Figure 2:
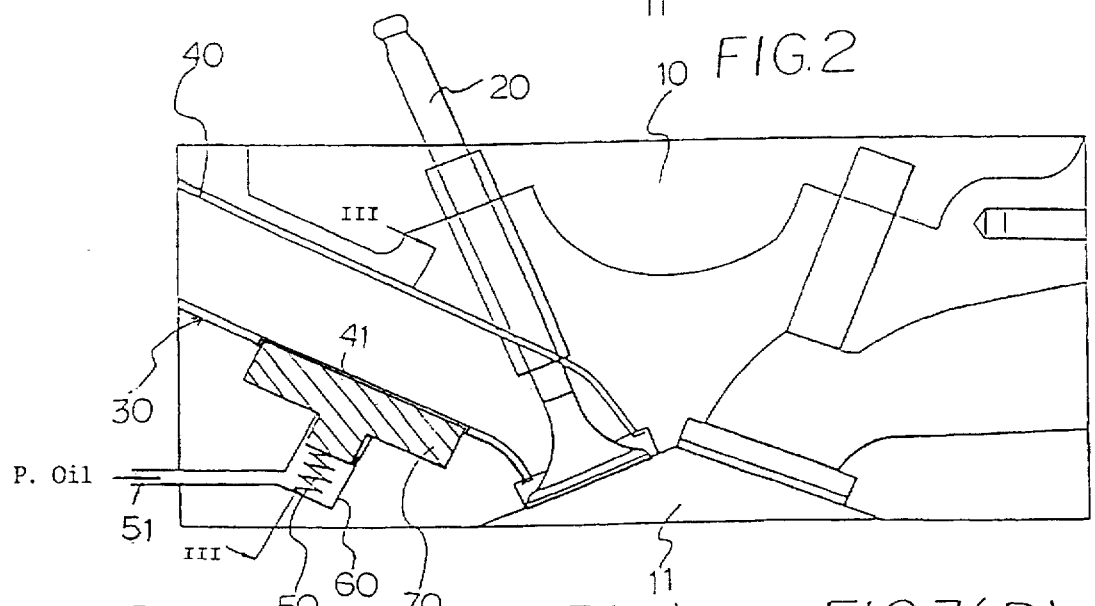
FIG. 2 is a top plane view of an intake port device for a DOHC engine of a vehicle according to the present invention.
Figure 3A:
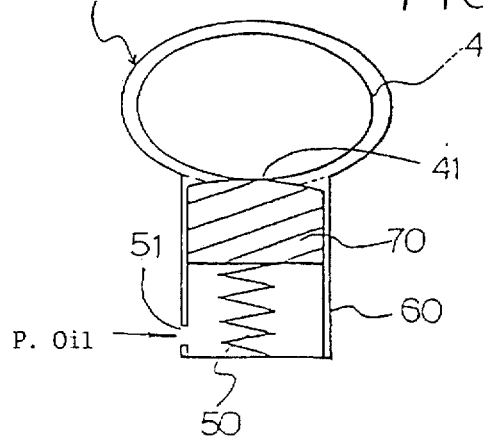
FIG. 3(A) is a cross-sectional view of FIG. 2, taken along line III—III, when the DOHC engine is operating at high speed.
Figure 3B:
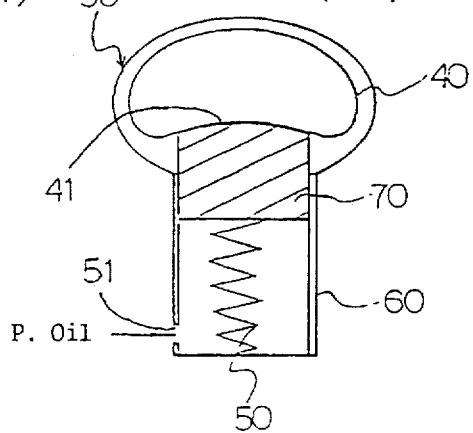
FIG. 3(B) is a cross-sectional view of FIG. 2, taken along line III—III, when the DOHC engine is operating at low speed.

Referring now in detail to the drawings for the purpose of illustrating preferred embodiments of the present invention, the intake port device for an engine of a vehicle is shown in FIGS. 2, 3(A) and 3(B). As shown, the intake port device according to the present invention includes a cylinder head 10; an intake port 30 formed in the cylinder head 10, as an intake and exhaust passage; an intake valve 20 which opens to allow air or an air mixture in the intake port 30 to enter into a cylinder 11 and which closes before a piston in the cylinder 11 compresses the air; an elastic rubber tube 40 inserted into the intake port 30; and a piston cylinder 60 having a T-shaped piston 70 therewithin. The T-shaped piston 70 contacts an outer wall surface 31 of a lower portion 41 of the elastic rubber tube 40. The elastic rubber tube 40 has resilient and thermostable properties.

The piston cylinder 60, as shown in FIGS. 3(A) and 3(B), includes the T-shaped piston 70 and a spring 50 disposed therewithin. An inlet 51 supplies hydraulic oil to the piston cylinder 60 when the engine is operating at low speed so that the T-shaped piston 70 pushes the lower portion 41 of the elastic rubber tube 40. Accordingly, the cross-sectional area of the intake port 30 is reduced to generate a swirling air flow. Consequently, atomization of the air can be effectively accelerated.

The intake port device for use in the DOHC engine of a vehicle operates as follows. As shown in FIG. 3(A), during high or normal speed operation of the DOHC engine, the inlet 51 does not supply hydraulic oil to the piston cylinder 60. Accordingly, the piston 70 does not push the lower portion 41 of the elastic rubber tube 40 into the intake port 30. But, since the air speed in the elastic rubber tube 40 is high, the air or air mixture has a swirling flow for accelerating atomization in the intake port 30 of the DOHC engine.

As shown in FIG. 3(B), when the speed of the DOHC engine is low, the inlet 51 supplies hydraulic oil to the piston cylinder 60. Then the T-shaped piston 70 pushes the lower portion 41 of the elastic rubber tube 40 into the intake port 30. The distance between the lower portion 41 and the upper portion of the elastic rubber tube 40 decreases, decreasing the cross-sectional area of the intake port 30. Therefore, even though the air speed is lower, a swirling air flow is generated to accelerate atomization and thus combustion in the DOHC engine of the vehicle.

The intake port device according to the present invention generates a swirling air flow during both high and low speed operation of the engine by controlling the cross-sectional area of the intake port 30. Furthermore, the supply speed of the hydraulic oil is inversely proportion to the speed of the DOHC engine.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An intake port device for an engine of a vehicle, comprising:

a cylinder head having an intake port therein;

an intake valve, disposed at an end of said intake port leading to an engine cylinder, for opening and closing said intake port; and cross-section control means for controlling a cross-sectional area of a portion of said intake port, said cross-section control means including, an elastic member disposed about an inner circumference of said intake port;

a piston member forming a portion of an inner wall of said intake port, and being covered by said elastic member.

2. The intake port device of claim 1, wherein said cross-section control means controls said cross-sectional area based on an engine speed of said engine.

3. The intake port device of claim 2, wherein said cross-section control means reduces said cross-sectional area when said engine is operating at low speed.

4. The intake port device of claim 1, wherein said portion of said intake port is near said end of said intake port leading to said engine cylinder.

5. The intake port device of claim 1, wherein said movable member forms a portion of said inner wall of said intake port near said end of said intake port leading to said engine cylinder.

6. The intake port device of claim 1, wherein said piston member is a hydraulically controlled piston.

7. The intake port device of claim 1, wherein said piston member moves into said intake port and compresses said elastic member which reduces said cross-sectional area of said intake port.

8. The intake port device of claim 7, wherein said piston member moves based on an engine speed of said engine.

9. The intake port device of claim 7, wherein said piston member moves to reduce said cross-section area when said engine is operating at low speed.

10. The intake port device of claim 1, wherein said elastic member is tubular and concentric with said intake port.

11. An intake port cross-sectional area control device, comprising:

an elastic member disposed about an inner circumference of an intake port of an engine for a vehicle; and a piston member forming a portion of an inner wall of said intake port, and being covered by said elastic member.

12. The control device of claim 11, wherein said piston member is a hydraulically controlled piston.

13. The control device of claim 11, wherein said piston member moves into said intake port and compresses said elastic member which reduces said cross-sectional area of said intake port.

14. The control device of claim 13, wherein said piston member moves based on an engine speed of said engine.

15. The control device of claim 13, wherein said piston member moves to reduce said cross-sectional area when said engine is operating at low speed.

16. The control device of claim 11, wherein said piston member forms a portion of said inner wall of said intake port near said end of said intake port leading to said engine cylinder.

17. The control device of claim 11, wherein said elastic member is tubular and concentric with said intake port.

* * * * *